3,524,893
SECONDARY ALCOHOL MANUFACTURE
William P. Doyle, Lagrangeville, N.Y., Kenneth H. Gee, Cincinnati, Ohio, and Charles H. Ware, Jr., and Harry Chafetz, Poughkeepsie, N.Y., assignors to Texaco Inc., New York, N.Y., a corporation of Delaware
Filed Dec. 22, 1967, Ser. No. 692,857
Int. Cl. C07c 29/12
U.S. Cl. 260—639
6 Claims

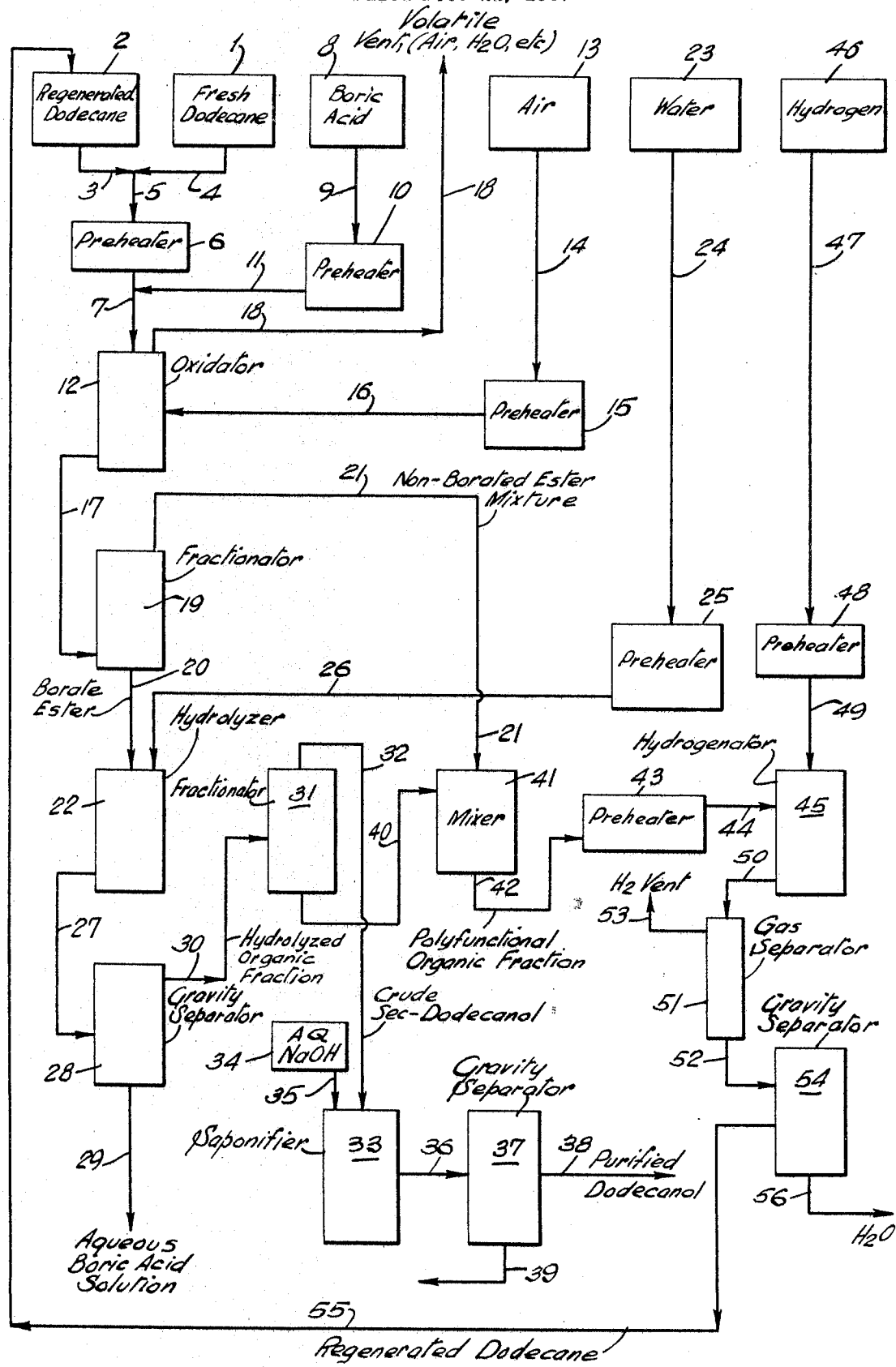

ABSTRACT OF THE DISCLOSURE

The manufacture of secondary alkanol from normal paraffin of an ultraviolet light (UV) absorbency at 260–280 m$\mu$ of less than 1 comprising first contacting said n-paraffin with an oxygen containing gas in the presence of a boric acid selected from the group consisting of orthoboric acid and metaboric acid to form a crude oxygenated product, fractionating said oxygenated product to remove unreacted paraffins, ketones, carboxylic acids and other volatile oxygenates as a first overhead, leaving n-alkyl borate ester as a first residue, contacting said borate ester residue with water under hydrolysis conditions, fractionating the hydrolyzed product to recover said secondary alkanols as overhead and polyfunctional oxidates as a second residue, combining said first overhead with said second residue and contacting the resultant combination with hydrogen in the presence of a Group VIII metal hydrogenation catalyst at a temperature less than about 700° F. to form an n-paraffin product of a UV absorbency at 260–280 m$\mu$ of less than about 1 and recycling said n-paraffin product to said first contacting step.

BACKGROUND OF INVENTION

Field of invention

A continuous process directed to the partial oxidation of n-paraffins to produce secondary alkanols.

Description of the prior art

In the past, one of the methods of preparing secondary alcohols calls for the oxidation of hydrocarbon in the presence of boric acid to form a crude oxygenated product. The product is subjected to distillation to remove unreacted hydrocarbon as overhead leaving a residuum containing a borate ester. The residuum is then hydrolyzed to form an organic layer comprising primarily alcohol and carboxylic acid and an inorganic layer of boric acid. The acid-alcohol layer is saponified to separate the acid from the alcohol, the acid being removed as a salt and the separated alcohol is subjected to distillation to recover purified alcohol as overhead.

Another method calls for the manufacture of alcohols by the air oxidation of saturated hydrocarbons in the presence of a boric acid compound. The oxidation products contain alkyl borate esters, ketones, carboxylic acids and their esters. Evaporation in vacuum removes the greater part of the unoxidized hydrocarbons and ketones as overhead. The overhead is condensed and hydrogenated to convert the ketones to alcohols and to saturate the olefins. The hydrogenated overhead is recycled to the oxidator together with fresh feed hydrocarbon and the borate esters are hydrolyzed to recover alcohol.

Although the foregoing methods produced acceptable quantities of secondary alcohols, they have the disadvantage of converting only a minor portion (e.g. 20–30 wt. percent) of the n-paraffin to the desired sec-alkanol through failure to reuse in the production of sec-alkanol the unreacted n-paraffin until it is essentially all consumed and failure to reconvert essentially all by-products to reusable n-paraffin. A possible reason for this failure was the art was unable to develop an integrated procedure for the sec-alkanol manufacture which would reduce and maintain in the unreacted n-paraffin feed the oxidation inhibiting polyaromatic content at an acceptable level, i.e., less than 1 UV absorbency at 260–280 m$\mu$ while simultaneously converting essentially all the by-product to n-paraffin of sufficient purity (i.e. 1 UV absorbency) to be reuseable in the procedure.

SUMMARY OF INVENTION

We have discovered and this constitutes our invention a continuous process of relative simplicity for the manufacture of secondary alkanol from n-paraffin whereby essentially all of the n-paraffin introduced in the process system is eventually converted into sec-alkanol without the build-up of polyaromatic oxidation inhibitors in the paraffinic feed to content greater than about 1 UV absorbency at 260–280 m$\mu$. The method of the invention accomplishes this result by a novel combination of process steps, ingredients and conditions.

Broadly, our method comprises contacting an n-paraffin of a UV absorbency of less than 1 at 260–280 m$\mu$ with an oxygen containing gas in the presence of boric acid to form oxygenated first reaction mixture containing alkyl borate esters, ketones, carboxylic acid, keto acids, lactones, non-borated esters, olefins and other degradation products in addition to the unreacted n-paraffin. The oxidation product is fractionated in a manner to remove essentially all product save the alkyl borate esters as a first overhead leaving the borate ester as a first residue. The borate ester is hydrolyzed to release the alcohols from their ester parents and the hydrolyzed product is fractionated to recover the desired sec-alkanol leaving an oxygenated polyfunctional second residue (primarily polyols) which is combined with first overhead derived from the fractionation immediately following the oxidation step. The combined fraction is hydrogenated in the presence of Group VIII metal hydrogenation catalyst under super-atmospheric pressure to convert all olefins and oxygenated by-product therein into n-paraffin of a UV absorbency of less than about 1 at 260–280 m$\mu$ and recycling the reconstituted n-paraffins together with fresh n-paraffin feed to the oxidator, the process being operated in a continuous or semi-continuous manner.

BRIEF DESCRIPTION OF THE DRAWING

FIG. 1 represents a flow diagram of an embodiment of the invention and is discussed in detail in Example I.

DETAILED DESCRIPTION OF THE INVENTION

Specifically, the method of the invention comprises introducing into an oxidation reactor maintained at a temperature between about 300 and 450° F. and above the melting point of the n-paraffin reactant either continuously or intermittently an n-paraffin from 10 to 25 carbons of a UV absorbency at 260–280 m$\mu$ of less than about 1 together with an oxygen containing gas in a quantity ratio of gas to n-paraffin of between about 4:1 and 20:1 and between about 1 and 7 wt. percent boric acid based on said n-paraffin feed. The n-paraffin and boric acid ingredients may be either premixed and added to the oxidator in admixture or introduced into the oxidator in separate streams. The oxygen containing gas is bubbled therethrough normally at a rate of between about 0.031 and 1.55 cu. ft. $O_2$/lb. reaction mixture per hour for between about 1 and 10 hours. Advantageously, the liquid reaction mixture is maintained in an agitated state. The oxidation product is either continuously or periodically withdrawn, normally from the bottom area of the reactor, with the withdrawal being adjusted so that the quantity of materials in the oxidator is essentially constant and the n-paraffin withdrawn is essentially between about 10 and 50 wt. percent oxidized. This usually indicates a non-gaseous mean residence time of between about 1 and 10 hours.

The withdrawn oxygenated reaction mixture is forwarded to a separator wherein unreacted paraffin, unsaturated hydrocarbons and all non-borated products such as ketones, keto carboxylic acids, lactones, carboxylic acids and esters thereof are removed from the borate ester of the desired alcohol. The separator generally constitutes a vacuum distillation apparatus wherein the unreacted paraffin, unsaturated hydrocarbon and the non-borated oxygenates are removed at elevated temperature under reduced pressure, e.g., at between about 100 and 465° F. under between about 1 and 760 mm. Hg, the paraffin, unsaturated hydrocarbon and non-borated oxygenates being taken off as overhead and the alkyl borate esters of desired alcohols being withdrawn as residue. The disposition of the unreacted hydrocarbon and non-borated oxygenate will be discussed later in this detailed description of the method.

The withdrawn alkyl borate ester is forwarded to a hydrolyzer wherein it is contacted with water, preferably under conditions of agitation at a temperature between about 100 and 212° F., said water being present in a stoichiometric excess to convert all ester groups to alcohol, preferably between about 10:1 and 42:1 moles water to borate ester. The hydrolyzed reaction mixture is continuously or intermittently withdrawn from the hydrolyzer, the amount of withdrawal normally being adjusted with the quantity of ingredients introduced in a manner to maintain the level of ingredients in the hydrolyzer essentially constant. The reaction ingredients in the hydrolyzer normally have a residence time of between about 1 and 60 minutes. The withdrawn hydrolyzed mixture is forwarded to a separator such as a gravity separator wherein two layers are formed, a top organic alcoholic layer and a bottom aqueous boric acid layer. The layers are separated by standard means such as decantation and the boric acid aqueous layer is either discarded or preferably delivered to a recovery system for boric acid recovery, e.g., via chilling and filtration. The recovered alcoholic organic layer is subjected to fractionation to separate the desired secondary alkanols from the polyfunctional products, such as polyhydric alcohols. Separation normally takes the form of vacuum distillation under between about 1 and 50 mm. Hg pressure at a temperature between about 100 and 465° F. with the desired secondary alcohol being recovered as overhead and sent to storage leaving the polyol-containing fraction as residue. Under preferred conditions, the secondary alcohol is further purified via saponification in order to remove esters having boiling points close to the secondary alcohol. This saponification is accomplished by contacting said overhead with between about 10 and 55 wt. percent, preferably 25 wt. percent, aqueous alkali metal hydroxide such as sodium hydroxide and potassium hydroxide at a temperature between about 100 and 215° F., preferably 110° F., for a period of time of from 1 to 80 minutes, preferably 30 minutes, utilizing a weight ratio of hydroxide to alcohol between about 0.05:1 to 1:1, preferably 0.3:1. The aqueous phase of the resultant mixture is separated from the alcohol phase by standard means such as via gravity separation. Still further purification of the alcohol product may be accomplished through periodic fractionation to strip out aromatic product. This is implemented when the absorbency of the paraffin rises above about 1 at 260–280 m$\mu$.

The polyol residue from the hydrolyzer together with the overhead fraction recovered from the reaction mixture removed from the oxidator are combined and then hydrogenated by contacting said combined mixture with a Group VIII metal hydrogenation catalyst at a temperature between about 450 and 700° F. under a hydrogen pressure of between about 200 and 2000 p.s.i.g. Advantageously, the hydrogenation comprises passing the organic feed together with hydrogen through the catalyst bed at a space velocity of between about 0.1 and 20 volumes feed/volume catalyst/hour and between about 0.5 and 10 cu. ft. hydrogen/lb. feed.

The n-paraffin product emitting from the hydrotreater prior to recycle is preferably forwarded to a separator to remove water therefrom by standard means such as employing a gravity separation or adding an azeotroping agent thereto e.g., benzene and distilling the water azeotrope as overhead. Under alternative conditions, boric anhydride may be added to the effluent to react with the water therein to form boric acid which together with the formed paraffin is recycled to the oxidator. In any case, the reformed n-paraffin is withdrawn from the hydrogenator or separator and recycled to the oxidator being combined with fresh n-paraffin feed when necessary to maintain the quantity requirements.

Examples of the n-paraffin reactants contemplated herein are dodecane, tridecane, hexadecane, eicosane, pentacosane, a mixture of $C_{10}$ to $C_{13}$ n-paraffins consisting of 23.7 wt percent decane, 45.6 wt. percent undecane. 27.7 wt. percent dodecane and 3 wt. percent tridecane, a mixture of $C_{10}$ to $C_{14}$ n-paraffin consisting of 11.3 wt. percent decane, 35.2 wt. percent undecane, 26.7 wt. percent dodecane, 25.8 wt. percent tridecane and 1.0 wt. percent tetradecane, and a mixture of $C_{13}$ to $C_{16}$ n-paraffins consisting of 2.5 wt. percent tridecane, 62.0 wt. percent tetradecane, 31.0 wt. percent pentadecane and 4.5 wt. percent hexadecane.

Examples of the oxygen containing gas contemplated herein are pure oxygen but more preferably for better oxidation control the diluted forms of oxygen such as air and oxygen-inert gas (e.g. nitrogen) mixtures are employed, said diluted forms containing between about 1 and 50 wt. percent oxygen.

Specific examples of the catalyst employed are platinum, palladium, nickel, rhodium and platinum black preferably supported on an inert material such as carbon or kieselguhr. Particularly suitable catalyst systems are nickel impregnated on kieselguhr, said nickel constituting between about 10 and 80 wt. percent of the catalyst system, 0.5 wt. percent platinum on carbon and 5 wt. percent rhodium on kieselguhr. The catalysts are preferably pretreated by contacting with hydrogen from between about 1 and 10 hours at between about 200 and 1000 p.s.i.g. and at 600 to 800° F. The catalyst employed is normally in extruded form of about ⅛" diameter and ¾" long.

As heretofore stated, one key feature of the invention is the discovery that through a particular combination of process conditions, ingredients and steps essentially all the n-paraffin feed introduced into the system can be ultimately converted into desired secondary alkanols without the need of separately treating the n-paraffin recycle with sulfuric acid in order to remove undesired oxidation inhibiting polyaromatics such as naphthalene and naphthalene derivatives. The main contributing factor to this accomplishment is the combination of specific catalyst, the maintenance of the temperature below about 700° F. in the hydrogenation step, and the combining of the residue containing a high concentration of oxygenates which is derived from the separation immediately following the water hydrolysis with the overhead having a relatively low concentration of oxygenates therein obtained from the separation step immediately following the oxidation phase of the process. Surprisingly, under the hydrogenation conditions essentially all the multitudinous oxygenates and unsaturated hydrocarbons are converted to the desired n-paraffin materials, and further surprisingly, without a build-up of oxidation inhibiting polyaromatic compound which would give the regenerated n-paraffin a UV absorbency greater than about 1 at 260–280 m$\mu$. Further, the high efficiency of the system due to the almost complete conversion of the n-paraffin feed through multiple recycle permits the recovery of secondary alkanol through hydrolysis without the need of elaborate purification procedures since the fractionation step may be adjusted to sacrifice yield for purity per fractionation pass and since the process through the continuous recycle of unreacted n-paraffin and the regeneration of the by-product into recycle n-paraffin produce essentially total conversion while permitting the per pass yield to be reduced in the interest of purity of the product. Another surprising feature in the method of the invention is it permits hydrogenation without the expected carbon to carbon bond cleavage thereby permitting the regeneration of the oxygenate and unsaturated hydrocarbon by-product into n-paraffins and alcohols of essentially the same carbon chain length found in the initial paraffin fresh feed.

The following examples further illustrate the invention but are not to be construed as limitations thereof.

EXAMPLE I

Referring to FIG. 1 of the drawing to a 6000 gallon glass lined oxidation reactor 12 maintained at a temperature of 350° F. there is charged through line 7 5580 lbs./hour of dodecane of a UV absorbency of less than 1 consisting of 909 lbs./hour fresh dodecane and 4671 lbs./hour recycled, regenerated dodecane respectively derived from tanks 1 and 2 and passed into line 7 through lines 3, 4 and 5 and preheater 6. Orthoboric acid at a rate of 276 lbs./hour is charged from tank 8 successively through line 9, preheater 10, and line 11 into line 7 wherein it intermixes with the dodecane charge and then is passed into the reactor 12. Air is introduced into reactor 12 at a rate of 140,000 standard cu. ft./hour from tank 13 through line 14, preheater 15 and line 16 into oxidation reactor 12. Preheaters 6, 10 and 15 are maintained at 350° F. The gas and non-gaseous ingredients are passed in countercurrent flow with liquid effluent withdrawn from reactor 12 through line 17 at an average rate of 5780 lbs./hour (170 lbs./hour lost through condenser), the rate being varied at periodic intervals in order to maintain a constant liquid reactant level in the reactor. Air, water, low boiling oxidation product (if any), and 170 lbs. n-paraffin carry over are passed out as overhead through line 18 for recovery of the n-paraffin. The liquid effluent withdrawn through line 17 is passed into vacuum distillation fractionator 19 maintained at 265° F. under 20 mm. Hg pressure and dodecyl borate ester and polyfunctionals are removed from the bottom of fractionator 19 through line 20 at a rate of 1653 lbs./hour and unreacted paraffins, olefins, ketones, lactones, keto acids, carboxylic acids and other non-borated materials are removed through line 21 as overhead. The dodecyl borate ester is passed through line 20 to hydrolyzer 22 and maintained at 160° F. Water at a rate of 8612 lbs./hour is introduced into said hydrolyzer 22 from tank 23 through line 24, preheater 25 maintained at 160° F., and line 26. The hydrolyzed reaction mixture is withdrawn at a rate of 1377 lbs./hour from hydrolyzer 22 through line 27 and forwarded to gravity separator 28. The aqueous boric acid solution is removed therefrom through line 29 at a rate of 8888 lbs./hour and the alcohol fraction through line 30. The alcohol fraction is introduced into vacuum distillation fractionator 31 maintained at 284° F. under 20 mm. Hg and an average of 830 lbs./hour crude sec-dodecanol is removed as overhead through line 32 and passed to saponifier 33 maintained at 190° F. Simultaneously charged to saponifier 33 is 249 lbs./hour of 25 wt. percent aqueous sodium hydroxide. The resultant mixture is passed through line 36 to gravity separator 37 whereupon purified dodecane is removed through line 38 to storage and the aqueous layer containing the carboxylic acid salt is withdrawn through line 39 for eventual ingredient recovery.

The bottom polyol fraction is withdrawn from fractionator 31 at a rate of 547 lbs./hour through line 40 and passed into mixer 41 together with the overhead from fractionator 19 forwarded through line 21. The combined mixed fraction is passed from mixer 41 through line 42 to preheater 43 maintained at 500° F. and thence through line 44 into the hydrogenator 45 at a rate of 4707 lbs./hour, said hydrogenator being packed with ⅛″ diameter by about ¾″ long extrusions of 60 wt. percent nickel impregnated on kieselguhr, the catalyst being pretreated by contacting with hydrogen at 800° F. Under an H₂ pressure of 500 p.s.i.g. Hydrogenator 45 is maintained at 550° F. and the hydrogen is simultaneously introduced therein at 18,000 standard cu. ft./hour from storage tank 46 through line 47, preheater 48 maintained at 500° F. and line 49. The hydrogenated liquid effluent is withdrawn from hydrogenator 45 through line 50 at a rate of 4725 lbs./hour and passed into separator 51. Excess hydrogen is vented through line 53, purified by standard means and eventually recycled to hydrogen tank 46. The gas free hydrogenated product consisting essentially of dodecane and a minor amount of water is passed to gravity separator 54 wherein water is removed therefrom through line 56 for discarding and regenerated dodecane of a UV absorbency of less than 1 is recycled to storage tank 2 through line 55.

Standard items such as pumps, valves and some storage tanks have not been shown in the flow diagram but are present where needed.

EXAMPLE II

To a 2 liter reactor fitted with a mechanical stirrer, gas inlet line ending with medium scintered glass sparger and Dean-Stark water trap, there is charged 1 kilogram of a mixture of $C_{10}$ to $C_{14}$ n-paraffins consisting of 11.3 wt. percent decane, 35.2 wt. percent undecane, 26.7 wt. percent dodecane, 25.8 wt. percent tridecane and 1.0 wt. percent tetradecane, and 50 grams of orthoboric acid. The reactor is heated to 347° F. and air is passed through the charged material at a rate of 1.5 liters per minute. At the end of the oxidation period the reaction mixture is stripped at 1 mm. Hg to a pot temperature of 374° F. The pot residue is refluxed (212° F.) with 300 mls. of water for 1 hour, separated and washed with an additional 300 mls. of water. Secondary alkanol of 10 to 14 carbons in an amount of 200 grams is recovered from the water washed product by distillation at 10 mm. Hg to a head temperature of 293° F. The overhead from the stripping operation and the pot residue remaining after distillation of the secondary alcohols is combined and passed through a fixed bed hydrogenation reactor containing 60 wt. percent nickel on kieselguhr as catalyst liquid space velocity rate of 4 volume feed/volume catalyst/hour at 560–585° F. under 500 p.s.i.g. hydrogen pressure. The nickel catalyst is pretreated for 2 hours at 800° F. under 500 p.s.i.g. hydrogen pressure. The hydrogenated material was recycled as feed to the oxidation reactor together with fresh $C_{10}$–$C_{14}$ n-paraffin feed for a subsequent oxidation and repeating the above process four additional times. The reaction yield and other oxygenate yields are shown in subsequent Table I. It should be noted that the first and fifth oxidation were equivalent in rate, conversion and product distribution thereby indicating no build-up of oxidation inhibiting polyaromatic compounds. It is to be further pointed out that essentially the complete conversion of n-paraffin to monofunctional secondary alkanol is approached if the cycles are continued. The test data and results in respect to the oxidation step are reported below in Table I:

TABLE I

| Run No. | 1 | 2 | 3 | 4 | 5 |
| --- | --- | --- | --- | --- | --- |
| Oxidation time, hr | 5.0 | 4.25 | 4.25 | 4.1 | 5.1 |
| Conversion, wt. percent | 34 | 36 | 35 | 35 | 35 |
| Sec. alkanol,[1] wt. percent | 21 | 22 | 20 | 20 | 20 |
| Polyols, wt. percent | 6 | 7 | 8 | 8 | 8 |
| Other Oxygenates, wt. percent | 7 | 7 | 7 | 7 | 7 |

[1] Consisting of an average of 11.3 wt. percent sec-decanol, 35.2 wt. percent sec-undecanol, 26.7 wt. percent sec-dodecanol, 25.8 wt. percent tridecanol and 1.0 wt. percent tetradecanol.

EXAMPLE III

The procedure of Example I is essentially repeated with the exception in hydrogenator 45 and preheater 43 the temperature is maintained at 750° F. At the end of 2 hours of continuous process operation the regenerated dodecane had a UV absorbency of 10 and had poisoned the oxidation reaction in oxidator 12 to the extent the rate of oxidation is reduced 90%.

EXAMPLE IV

The procedure of Example I is essentially repeated with the exception the- overhead from oxidator 12 and the liquid effluent from hydrolyzer 22 are separately hydrogenated and then subsequently combined. The hydrogenation conditions and reactant ratios are the same as those employed in Example I. After 3 hours of continuous operation UV absorbency of the recycle dodecane stream entering storage tank 4 has built up to 10 resulting in a reduction of the rate of the oxidation reaction by about 90%.

EXAMPLE V

The procedure of Example I is essentially repeated with the exception the hydrogenation catalyst employed is copper chromite. The amount of n-paraffin regenerated was reduced about 50% in respect to that produced in Example I.

We claim:
1. A method of manufacturing secondary alkanol of from 10 to 25 carbons comprising:
 (a) contacting an n-paraffin of 10 to 25 carbons having an ultraviolet light absorbency at 260-280 m$\mu$ of less than 1 with an oxygen-containing gas in a mole ratio of said gas to said n-paraffin of between about 4:1 and 20:1 in the presence of between about 1 and 7 wt. percent of a boric acid based on said n-paraffin selected from the group consisting of metaboric acid and orthoboric acid at a temperature of between about 300 and 450° F. to form an oxygenated reaction mixture,
 (b) fractionating said reaction mixture to obtain an alkyl borate ester residue and a first overhead mixture consisting essentially of all unreacted n-paraffin, degradation products including olefins, and oxygenated products other than said borate ester,
 (c) contacting said borate ester residue with water at a temperature between about 100 and 212° F. utilizing a mole ratio of water to said borate ester of between about 10:1 and 42.1 to form a hydrolysis mixture comprising a top organic secondary alkanol layer and a bottom aqueous boric acid layer,
 (d) separating said layers,
 (e) fractionating said alkanol layer to obtain a polyfunctional residue comprising polyhydric alcohols and a second overhead comprising the desired secondary alkanol,
 (f) combining the first overhead mixture and the polyfunctional residue to obtain a combined mixed fraction,
 (g) contacting said mixed fraction with hydrogen at a temperature of between about 450 and 700° F. under a hydrogen pressure of between about 200 and 2000 p.s.i.g. in the presence of a catalyst selected from the Group VIII metals to form an n-paraffin product of a UV absorbency of less than 1 at 260–280 m$\mu$ of from 10 to 25 carbons and,
 (h) recycling said n-paraffin product to said first contacting.

2. A method in accordance with claim 1 wherein said boric acid is orthoboric acid, said catalyst is between about 10 and 80 wt. percent nickel on kieselguhr, said catalyst is pretreated by contacting with hydrogen at between about 600 and 800° F. under between about 200 and 1000 p.s.i.g. hydrogen pressure for a period of between about 1 and 10 hours.

3. A method in accordance with claim 2 wherein said n-paraffin is a mixture of decane, undecane, dodecane, tridecane and tetradecane and said secondary alkanol is a mixture of secondary decanol, sec-undecanol, sec-dodecanol, sec-tridecanol and sec-tetradecanol.

4. A method in accordance with claim 2 wherein said n-paraffin is dodecane and said secondary alcohol is sec-dodecanol.

5. A method in accordance with claim 1 wherein said second overhead in said step "e" is contacted with a 10–55 wt. percent aqueous alkali metal hydroxide at temperatures between about 100 and 215° F. in a wt. ratio of said alkali metal hydroxide to said secondary alcohol being between about 0.05:1 to 1:1.

6. A method in accordance with claim 5 wherein said alkali metal hydroxide is sodium hydroxide.

References Cited

UNITED STATES PATENTS

| | | |
|---|---|---|
| 2,992,278 | 7/1961 | Tedeschi _____ 260—683.9 |
| 3,232,704 | 2/1966 | Helbig et al. |
| 3,239,552 | 3/1966 | Feder et al. |
| 3,375,265 | 3/1968 | Fetterly et al. |
| 3,419,615 | 12/1968 | Inchalik et al. |

OTHER REFERENCES

Bashkirov et al.: "World Petroleum Congress," 5th proceedings, New York (1959), vol. 4, pp. 175–183.

LEON ZITVER, Primary Examiner

J. E. EVANS, Assistant Examiner

U.S. Cl. X.R.

260—643, 683.9, 632, 635